(12) United States Patent
Araki

(10) Patent No.: US 7,600,799 B2
(45) Date of Patent: Oct. 13, 2009

(54) CONSOLE BOX STRUCTURE

(75) Inventor: Masanori Araki, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 0 days.

(21) Appl. No.: 12/292,744

(22) Filed: Nov. 25, 2008

(65) Prior Publication Data

US 2009/0134652 A1    May 28, 2009

(30) Foreign Application Priority Data

Nov. 27, 2007    (JP) .............................. 2007-306468

(51) Int. Cl.
*B60N 3/00* (2006.01)
(52) U.S. Cl. .................... 296/24.43; 296/37.3; 280/735
(58) Field of Classification Search ............. 296/24.43, 296/37.3; 280/735
See application file for complete search history.

(56) References Cited

U.S. PATENT DOCUMENTS 7,007,993 B2 *   3/2006   Kubota ..................... 296/24.34
7,222,906 B2 *   5/2007   Sakakibara et al. ...... 296/24.34

FOREIGN PATENT DOCUMENTS

JP    2005-254881    9/2005

* cited by examiner

*Primary Examiner*—Lori L Lyjak
(74) *Attorney, Agent, or Firm*—Wenderoth, Lind & Ponack, L.L.P.

(57) ABSTRACT

A console box assembly is configured such that a box body (3) within a console box (2) is divided into a potential drop away part (15), which is located in proximity to a proximity part (9), and a fixed installation part (16), which is a unit of the box body (3) other than the potential drop away part (15), such that, under normal circumstances, the fixed installation part (16) and the potential drop away part (15) are combined in a unified manner, whereas, in an emergency, the potential drop away part (15), which is in contact with the proximity part (9), is capable of separating from the fixed installation part (16).

7 Claims, 9 Drawing Sheets

CONSOLE BOX STRUCTURE

CROSS REFERENCE TO THE RELATED APPLICATION

The present application is based on and claims priority from Japanese Patent Application Number 2007-306468, filed on Nov. 27, 2007, the disclosure of which is hereby incorporated by reference herein in its entirety.

BACKGROUND OF THE INVENTION

1. Field of the Invention

The present invention relates to an improvement in a console box structure, in particular, used for a vehicle.

2. Description of the Related Art

There exists an installation of a center console between a driver seat and a passenger seat in a passenger compartment of a vehicle, such as an automobile; refer, as an instance thereof, to Japanese Patent Application Laid Open No. 2005-254881.

Figure 6:
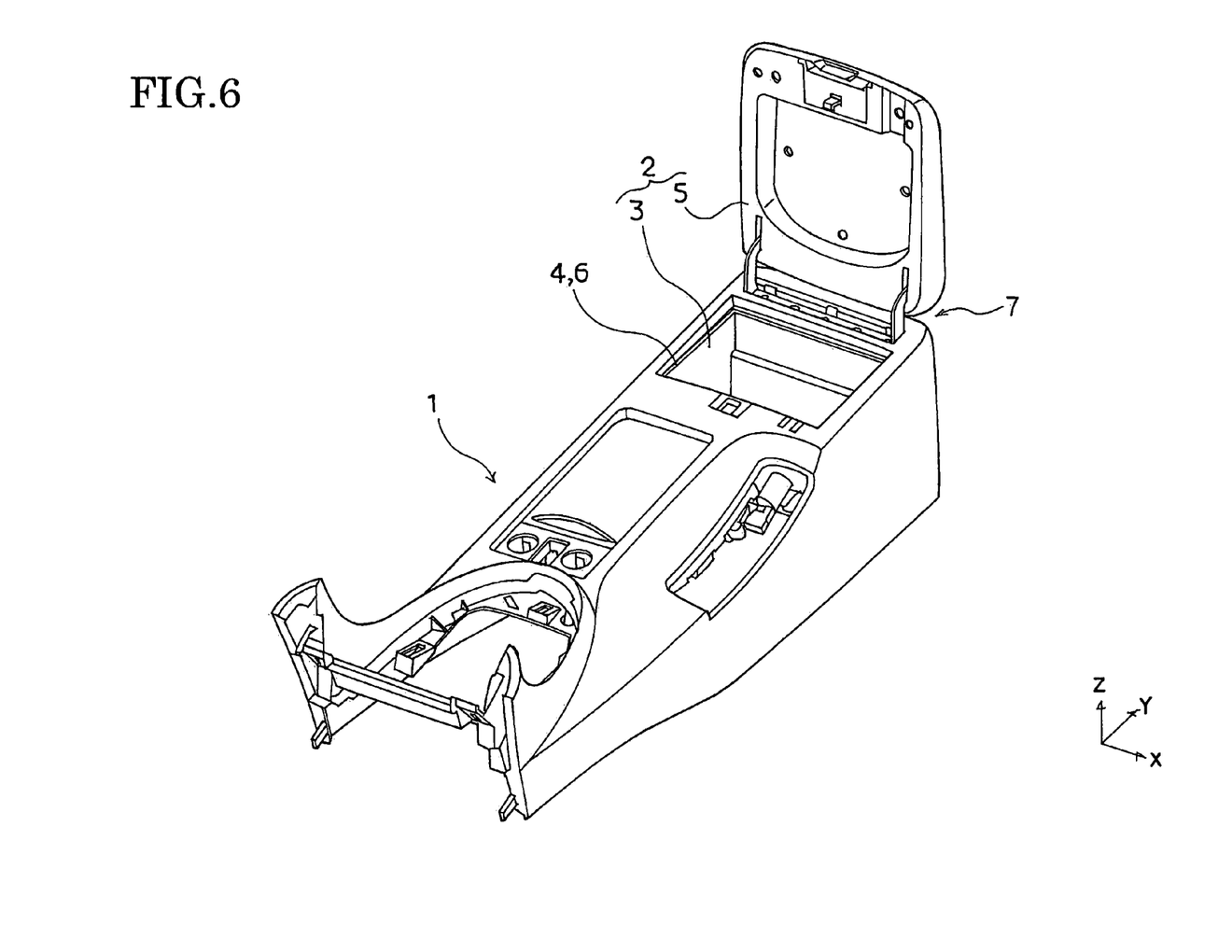
FIG. 6 is a perspective view showing a center console overall, both a conventional center console and a center console that is employed to describe the present invention.

FIG. 6 is an instance of a center console 1, wherein a console box 2 is normally formed within a rear portion of the center console 1.

Such a console box 2 therein comprises a box body 3, which is shaped as a container, and which opens from an upper surface thereof, and a lid body 5, which is installed so as to be capable of being opened and closed with respect to an opening portion 4 of the upper surface of the box body 3 thereof.

In such a circumstance, the box body 3 is treated as a single object that is formed from a resin.

Figure 7:
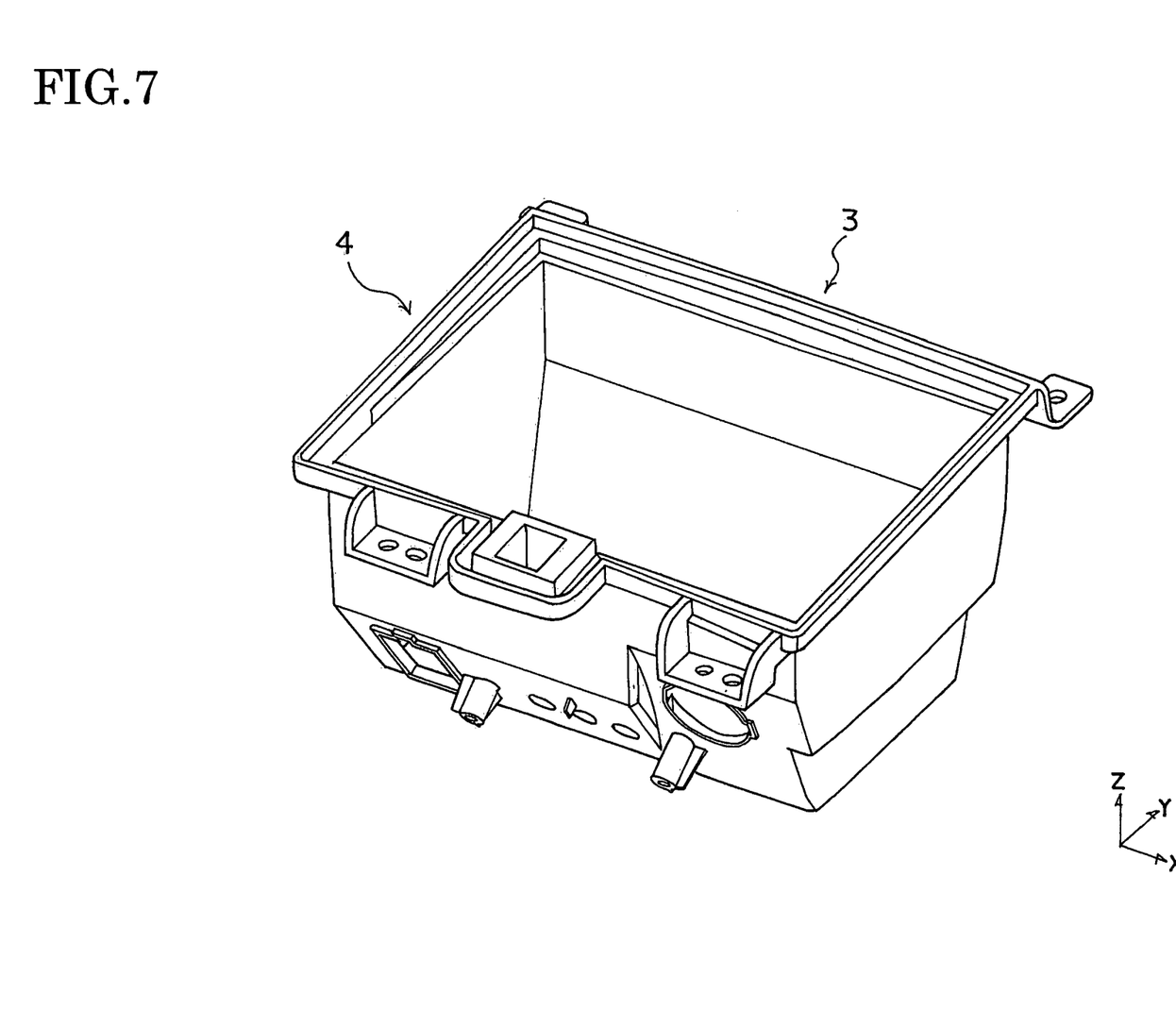
FIG. 7 is an oblique view of a conventional instance of a box body with respect to a console box that is installed within a rear portion of the center console that is depicted in FIG. 6.
Figure 8:
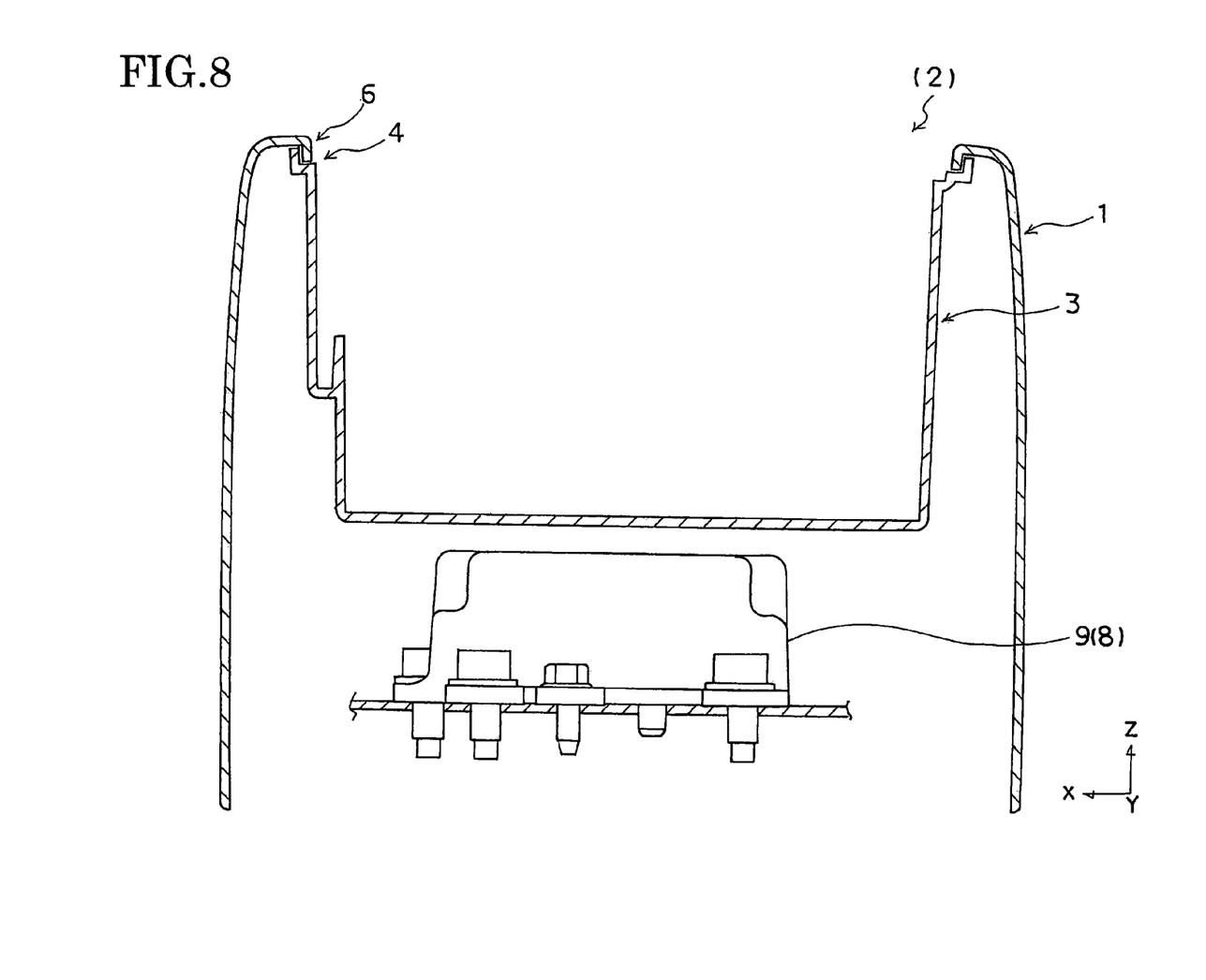
FIG. 8 is a horizontal cutaway view of the box body that is depicted in FIG. 7, in a state of being mounted into a console box.
Figure 9:
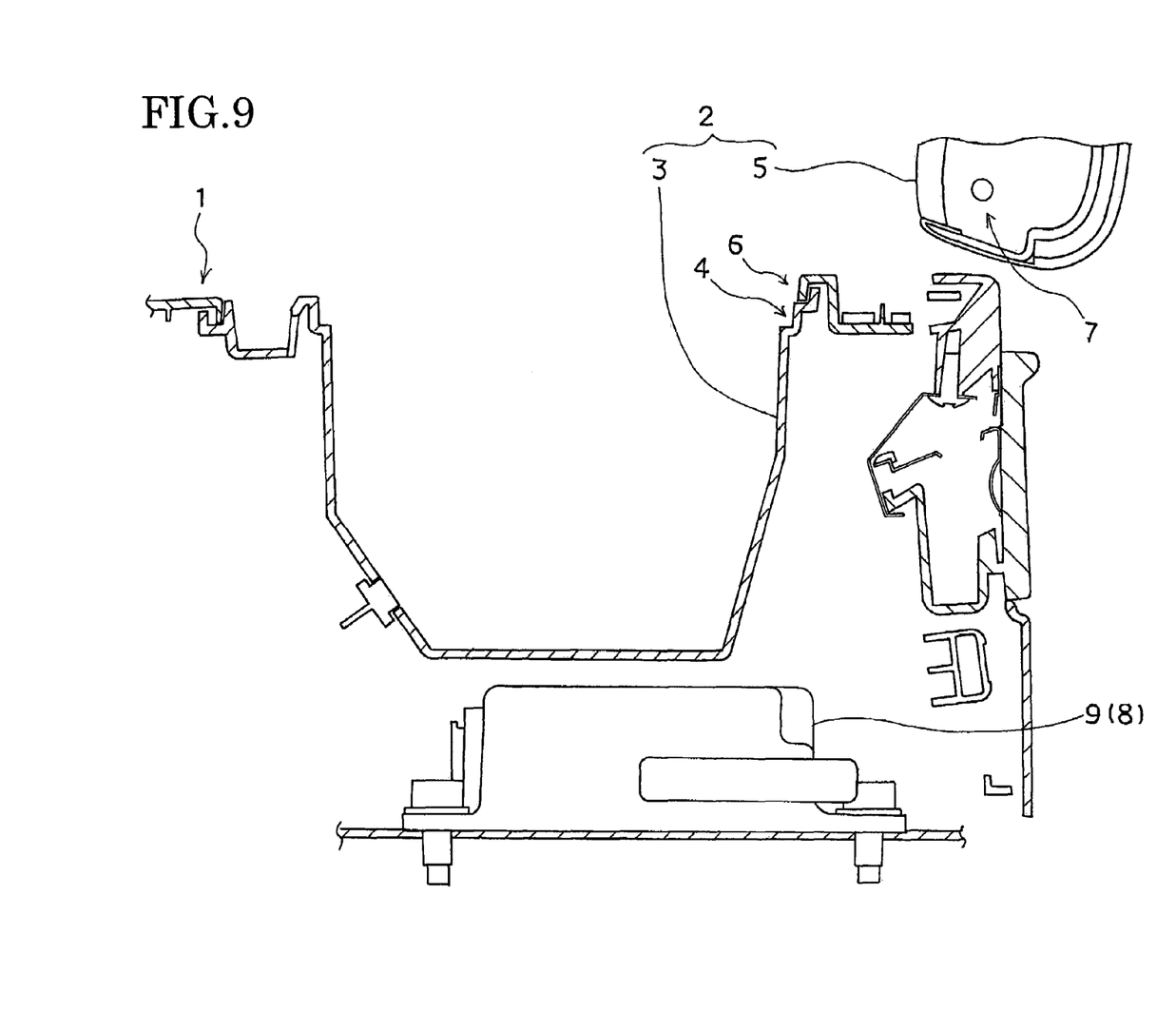
FIG. 9 is a vertical cutaway view of the box body that is depicted in FIG. 7, in a state of being mounted into a console box.

Turning to a more detailed description thereof, the box body 3 is such as is depicted in FIG. 7, and is contained within an interior of the center console 1, such as is depicted in FIG. 8 and FIG. 9. A corresponding opening portion 6 is formed upon a rear portion upper surface of the center console 1 in a location that corresponds to the opening portion 4 of the upper surface of the box body 3. The opening portion 4 of the upper surface of the box body 3 is connected with an opening portion 4 of the upper surface of the rear portion of the center console 1 around approximately an entire periphery thereof. The lid body 5 is mounted upon the center console 1 so as to be capable of opening and closing thereupon, by way of a hinge unit 7; refer to FIG. 6 and FIG. 9 for particulars thereof. The hinge unit 7 is installed in a location that is to a rear of a direction Y of a length of a vehicle with respect to the opening portion 4. The lid body 5 is treated as being capable of opened and closed in both a vehicle height direction Z and the vehicle length direction Y, by way of the hinge unit 7.

In such a circumstance, a proximity part 9, such as an air bag sensor 8, is installed beneath the box body 3.

According to such a configuration, the box body 3 appears by opening the lid body 5, centering upon the hinge unit 7, and it is thereby possible to insert an item into, and remove an item from, the box body 3.

Conversely, the box body 3 is concealed by closing the lid body 5, centering upon the hinge unit 7, and it is thereby possible to store an item within the box body 3.

Given the conventional console box described herein, however, the box body 3 is treated as a single unit formed from a resin, and thus, in an emergency, when a passenger's head or other body part makes contact from above with the lid body 5 in the closed state thereof, the box body 3 may cause a significant recoil by coming into contact with the proximity part 9, such as an air bag sensor 8.

SUMMARY OF THE INVENTION

It is an objective of the present invention to provide a configuration of a console box that is capable of reducing to a minimum an occurrence of a recoil with respect to an emergency therewith.

In order to achieve the objective described herein, a structure of a console box according to an embodiment of the present invention divides a box body of a console box into a potential drop away part, which is located in a proximity to a proximity part, and a fixed installation part, which is other than the potential drop away part, and is configured such that, under a normal usage circumstance thereof, the fixed installation part and the potential drop away part is combined in a unified manner, whereas, in an emergency, the potential drop away part, which is in contact with the proximity part, is capable of separating from, and dropping away with respect to, the fixed installation part.

In the present circumstance, the proximity part is such as an air bag sensor, which is located beneath the box body, and the potential drop away part is a base plate configuration member of the box body.

DETAILED DESCRIPTION OF THE PREFERRED EMBODIMENTS

Preferred embodiments of the present invention will be explained in detail hereinafter with reference to the accompanying drawings.

FIG. 1 to FIG. 5 illustrate an embodiment of a console box structure according to the present invention.

It is to be understood that a center console and a console box shown in FIG. 1 to FIG. 5 are fundamentally approximately identical to a center console and a console box that which are described with reference to FIG. 6 to FIG. 9, and thus, it would be possible to refer to FIG. 6 to FIG. 9 as necessary, as well as to treat a disclosure therein as a description according to the embodiment.

In the present circumstance, identical or similar components between FIG. 1 to FIG. 5 and FIG. 6 to FIG. 9 will be labeled with identical reference numerals. Different components therebetween, however, will be treated as according to the depiction in FIG. 1 to FIG. 5.

A center console 1, such as is depicted in FIG. 6, is installed in a component of a space between a driver's seat and a passenger seat within a passenger compartment with regard to a vehicle, such as an automobile. The center console 1 includes a rear portion treated as a console box 2 thereof.

The console box 2 includes a box body 3, which is shaped as a container, and which is open at an upper surface thereof, and a lid body 5, which is installed so as to be capable of being opened and closed with respect to an opening portion 4 of the upper surface of the box body 3 thereof.

Figure 1:
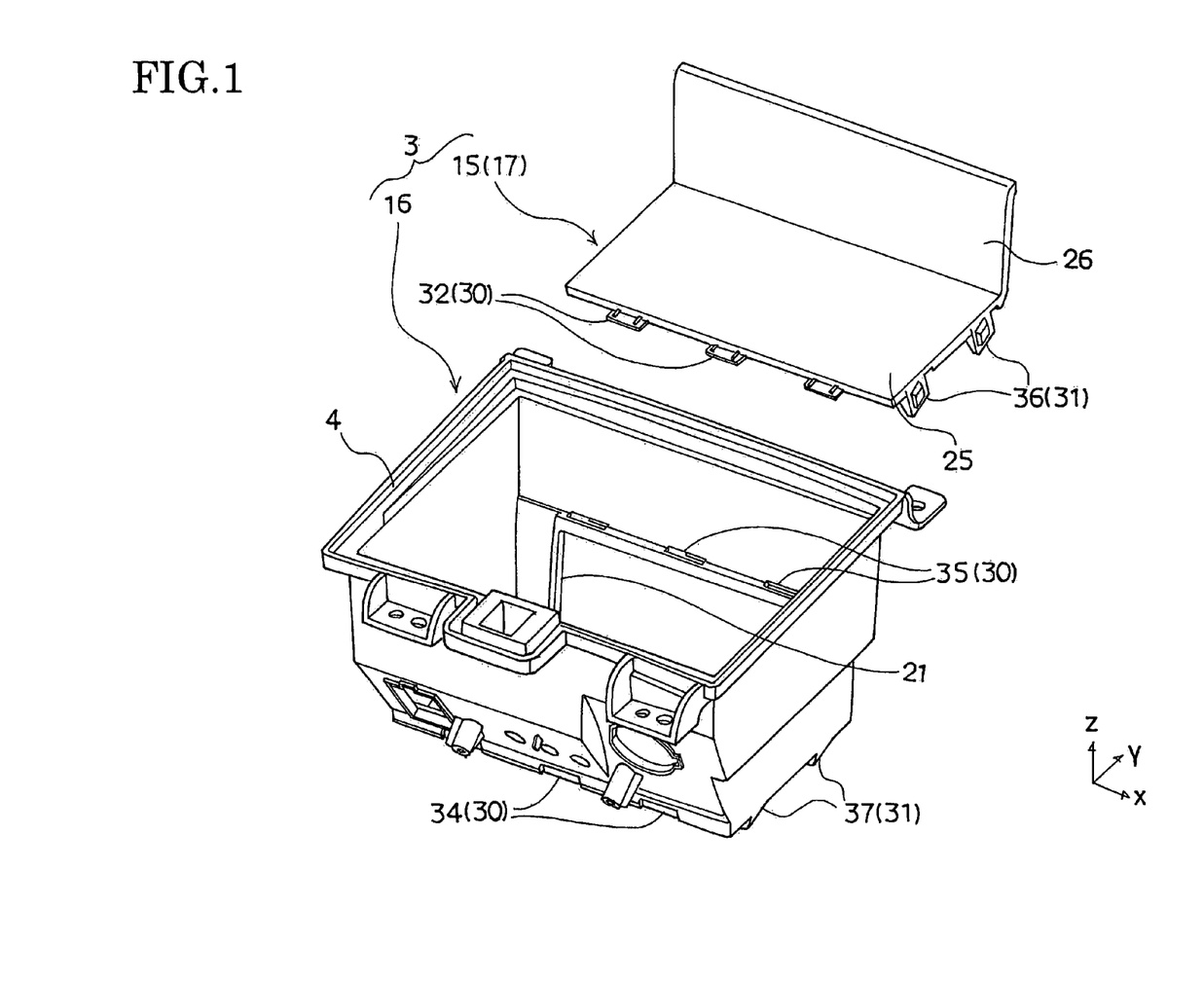
FIG. 1 is a perspective exploded view of a box body that is employed in a console box structure according to an embodiment of the present invention.
Figure 2:
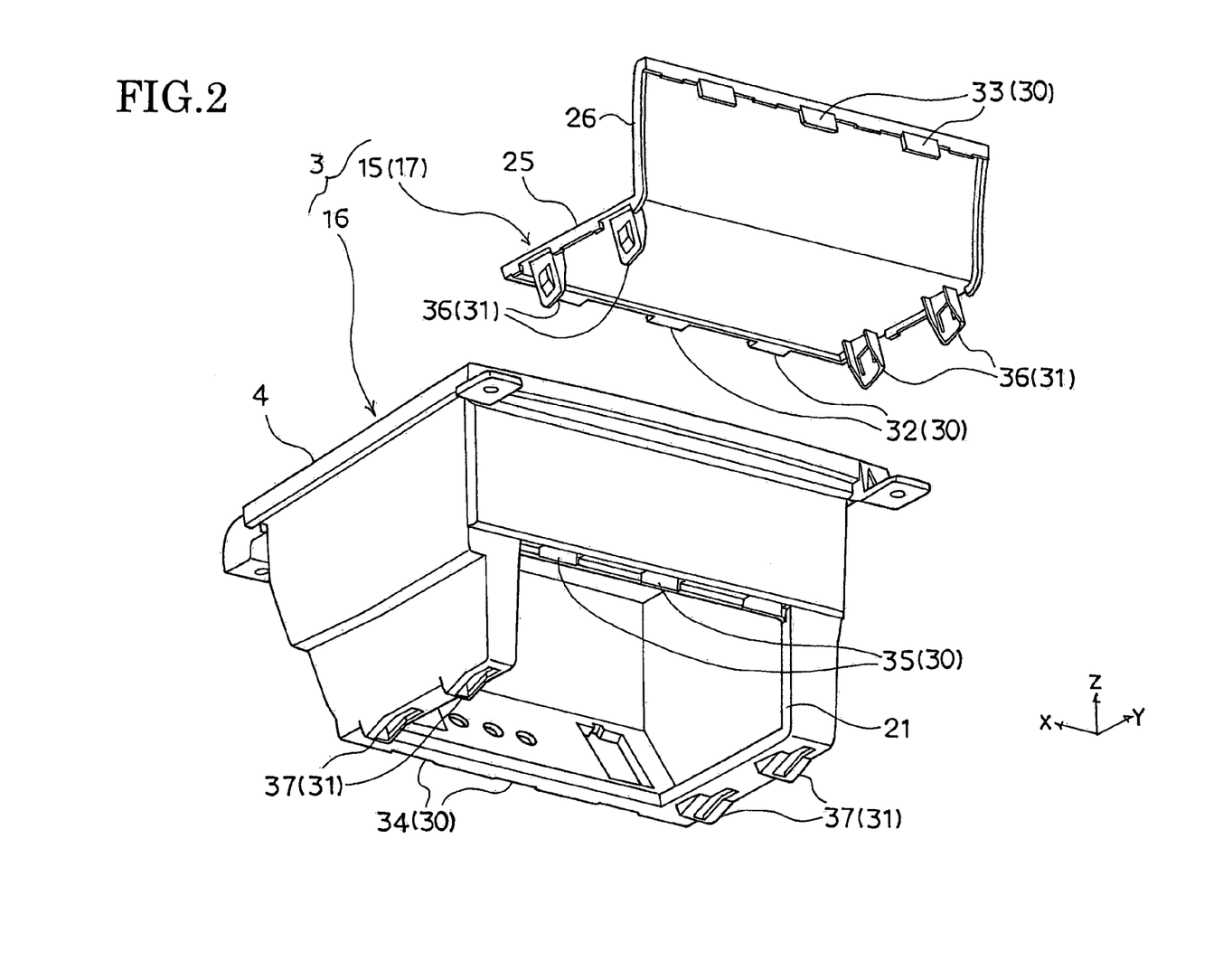
FIG. 2 is a perspective exploded view of the box body that is depicted in FIG. 1 as seen from a different direction, i.e., from below.
Figure 3:
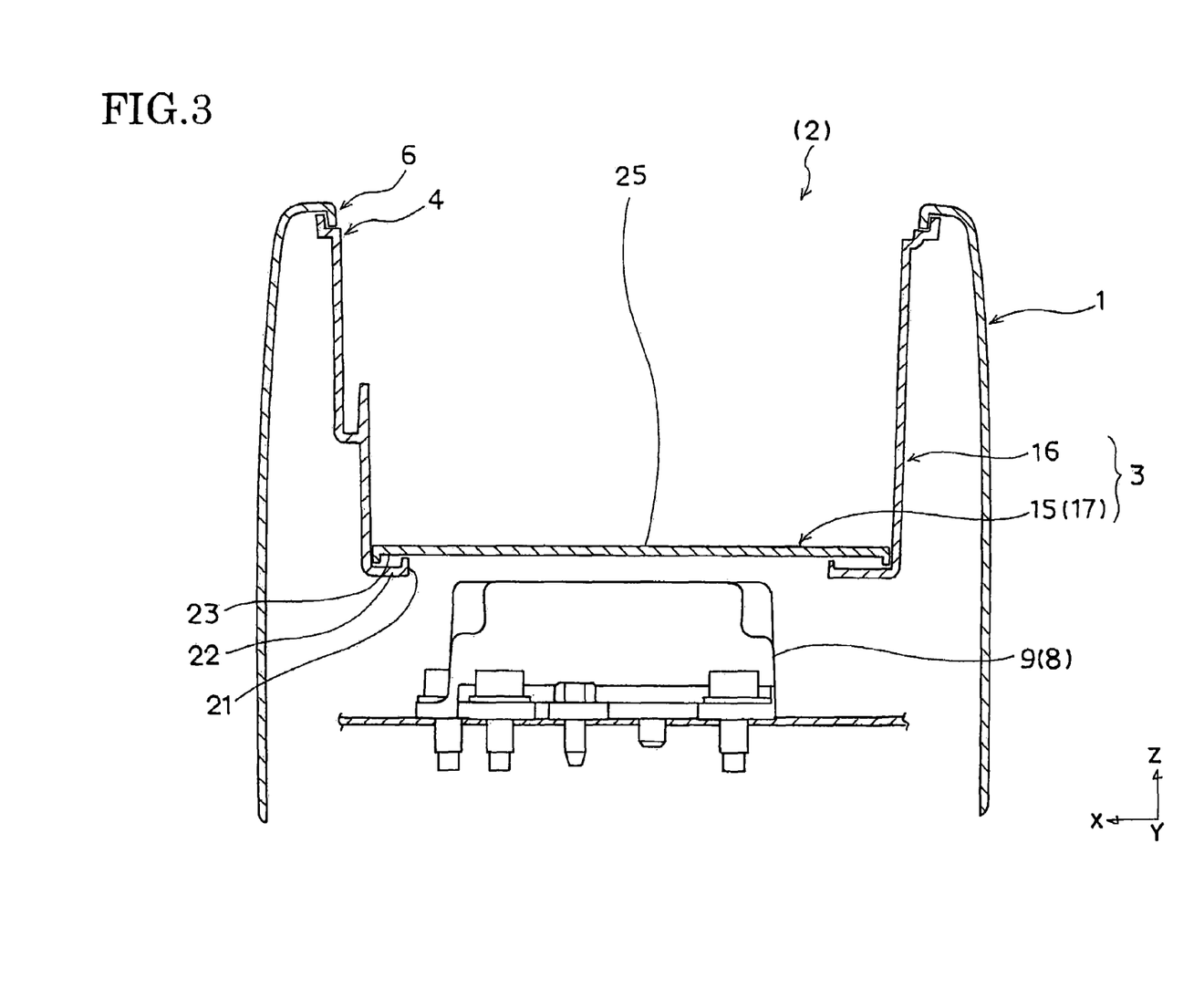
FIG. 3 is a horizontal cutaway view of the box body that is depicted in FIG. 1, in a state of being mounted into a console box.
Figure 4:
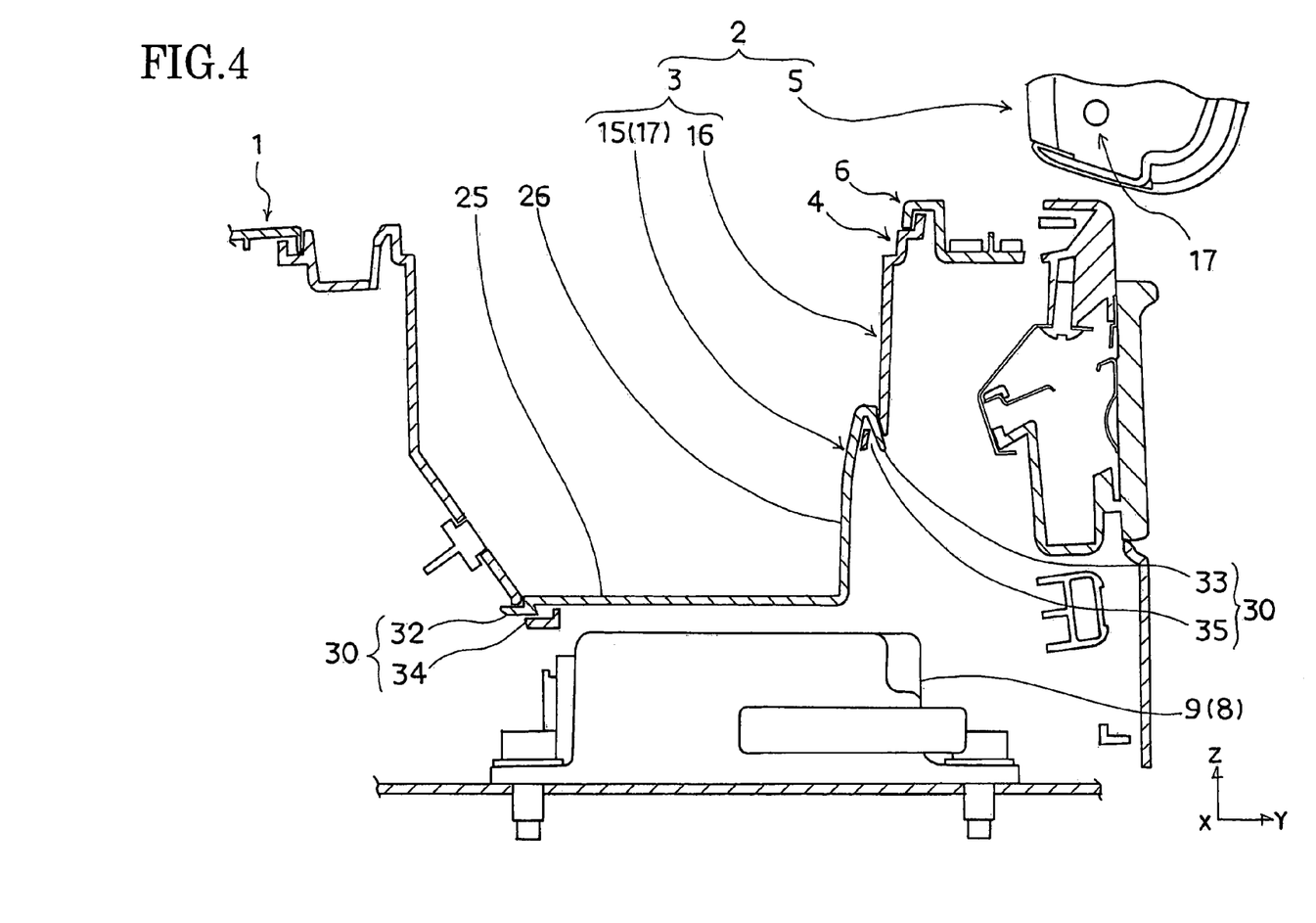
FIG. 4 is a vertical cutaway view of the box body that is depicted in FIG. 1, in a state of being mounted into a console box.

Turning to a more detailed description of the configuration thereof, the box body 3 is treated as including an approximately rectangular shape, which in turn includes a frontal and a rear wall portion, a left and a right wall portion, and a base plate, such as is shown in FIG. 1 and FIG. 2. Thus, the box body 3 is housed within an interior portion of the center console 1, such as is shown in FIG. 3 and FIG. 4. An opening portion 6 is formed in an upper surface of the rear portion of the center console 1, in a location facing the opening portion 4 of the upper surface of the box body 3 thereof. The opening portion 4 of the upper surface of the box body 3 thereof is connected with an opening portion 4 of the upper surface of the rear portion of the center console 1 around approximately an entire periphery thereof. The lid body 5 is mounted upon the center console 1 so as to be capable of opening and closing thereupon, by way of a hinge unit 7; refer to FIG. 4 and FIG. 6 for particulars thereof. The hinge unit 7 is installed in a location that is to a rear of a direction Y of a length of a vehicle with respect to the opening portion 4. The lid body 5 is treated as being capable of opened and closed in both a height direction Z and the vehicle length direction Y, by way of the hinge unit 7.

It is to be understood that the configuration described herein is approximately identical to the conventional instance described herein as well.

Thus, with the configuration of the console box 2 according to the embodiment, with respect to the basic structure such as is described herein, the box body 3 of the console box 2 is divided into a potential drop away part 15, which is located in a proximity to a proximity part 9 (refer to FIG. 3 and FIG. 4 for particulars thereof herein and hereinafter), and a fixed installation part 16, which is a unit of the box body 3 that is other than the potential drop away part 15, and is configured such that, under a normal usage circumstance thereof, the fixed installation part 16 and the potential drop away part 15 is combined in a unified manner, whereas, in an emergency, the potential drop away part 15, which is in contact with the proximity part 9, is capable of separating from, and dropping away with respect to, the fixed installation part 16. Put another way, the box body 3 is formed into a separated body, made from a resin, comprising the fixed installation part 16 and the potential drop away part 15.

It is to be understood that the configuration described herein is a minimum configuration that would be necessary to carry out a required operating effect, and a degree of freedom is present with respect to a configuration that is not described herein. As an instance thereof, such as a (more concrete) configuration of such as the box body 3, the proximity part 9, the potential drop away part 15, and the fixed installation part 16, as well as an interrelation therebetween, and furthermore, a configuration other than the configuration described herein, would still be arbitrarily permissible at the present stage. In addition, an item that could be read into the disclosure of the configuration described herein would be included within the scope thereof, even in a circumstance wherein the item thereof is not disclosed in any particularly concrete manner.

In the present circumstance, the proximity part 9 is a part that is installed in a proximity to the box body 3. It would be conceivable for the proximity part 9 to comprise any of a wide range of types of components.

Thus, with regard to the description provided herein, the proximity part 9 in particular is treated as an in-vehicle instrument 8, which is located beneath the box body 3, and the potential drop away part 15 is treated as a base plate configuration member 17 of the box body 3. In one embodiment, the in-vehicle instrument 8 includes an air bag sensor, electronic device or the like.

In the present circumstance, the in-vehicle instrument, for example, the air bag sensor 8 is treated as being smaller overall than a base plate component of the box body 3. The air bag sensor 8 is fixed upon an upper surface of such as a floor panel of the vehicle.

Conversely, the base plate configuration member 17 configures a portion of the base plate component of the box body 3, and is configured so as to be smaller to a degree overall than the base plate component of the box body 3, as well as larger to a degree overall than the air bag sensor 8.

Conversely, a lower portion opening 21 is formed, in order to mount the base plate configuration member 17 with respect to a base plate component of the fixed installation part 16. When the base plate configuration member 17 is mounted within the lower portion opening 21 thereof and closed thereupon, the lower portion opening 21 is made larger to a degree in a vehicle width direction X than the base plate configuration member 17, such that an overlap unit 22 and 23 (refer to FIG. 3 for particulars thereof herein and hereinafter) is formed in a space between both edge portions of the fixed installation 16 and the base plate configuration member 17. In such a circumstance, the lower portion opening 21 is larger to a degree in the vehicle width direction X than the air bag sensor 8.

In the present circumstance, the base plate configuration member 17 is treated as an approximately L-shaped material, in an elevation view thereof, comprising a horizontal surface component 25, which corresponds to a base plate of the box body 3, and a vertical surface component 26, which corresponds to a lower portion of a rear wall of the box body 3, such as is depicted in FIG. 1, FIG. 2, and FIG. 4. The lower portion opening 21 and the overlap unit 22 and 23, corresponding thereto, is formed so as to encompass a range that corresponds to the horizontal surface component 25 and the vertical surface component 26 with regard to the base plate, and the lower portion of the rear wall, of the box body 3.

Furthermore, an imposition unit capable of separation and dropping away in time of emergency 30 and 31 is installed between the fixed installation part 16 and the potential drop away part 15, in order to facilitate a separation and a dropping away of the potential drop away part 15 with respect to the fixed installation part 16.

In the present circumstance, the imposition unit capable of separation and drop away in time of emergency 30 comprises a fore and aft protrusion tab 32 and 33, which is installed upon the base plate configuration member 17, and, corresponding thereto, a fore and aft protrusion unit 34 and 35, which is installed upon the fixed installation part 16. The protrusion tab 32 and 33 is formed so as to be respectively capable of protruding with respect to the protrusion unit 34 and 35. Put another way, the protrusion tab 32 is formed so as to protrude approximately straight ahead in approximately the vehicle length direction Y with respect to a leading edge unit with respect to the horizontal surface component 25 of the base plate configuration member 17, and the protrusion unit 34 is formed so as to be opened at a location that corresponds to a leading edge unit of the lower portion opening 21. In addition, the protrusion tab 33 is formed so as to protrude approximately downward in approximately the vehicle height direction Z with respect to a trailing edge unit, i.e., an upper edge unit, with respect to the vertical surface component 26 of the base plate configuration member 17, and the protrusion unit 35 is formed so as to be opened at a location that corresponds to a trailing edge unit, i.e., an upper edge unit, of the lower portion opening 21. In particular, the rear protrusion tab 33 is formed at an angle so as to expand externally, i.e., toward the rear thereof, to a degree, in order to facilitate a capability of a retention of an elasticity thereof, to a given extent, when the rear protrusion tab 33 protrudes into the corresponding protrusion unit 35, such as is depicted in FIG. 4. It is to be understood that a plurality of the protrusion tab 32 and 33, and of the protrusion unit 34 and 35, is installed respectively with regard to the vehicle width direction X.

Furthermore, the imposition unit capable of separation and dropping away in time of emergency 31 comprises a left and a right catch unit 36, which is installed upon the base plate configuration member 17, and a left and a right catch perforation unit 37, which is installed upon the fixed installation part 16, such as is depicted in FIG. 2. The catch unit 36 is configured so as to be capable of penetrating, and of locking with, the catch perforation unit 37. The catch unit 36 is formed so as to protrude in an approximately downward direction in approximately the vehicle height direction Z, with respect to a left and a right edge unit with respect to the horizontal surface component 25 of the base plate configuration member 17, and the catch perforation unit 37 is formed so as to open upon a left and a right edge unit of the lower portion opening 21. Put another way, the catch unit 36 and the catch perforation unit 37 is installed upon the overlap unit 22 and 23. It is to be understood that it would be desirable for the catch unit 36 to be formed so as to incline forward to a degree, in order to be facing in an approximately straight line direction of a circle, the protrusion tab 32 and the protrusion unit 34 is at a center whereof. Correspondingly thereto, it would be desirable for the catch unit 37 to be formed so as to incline so as to be perpendicular with regard to the catch unit 36 that formed in the forward incline shape to a degree thereof. Consequently, the catch unit 37 is formed into a component that overhangs diagonally downward with respect to the base plate of the box body 3. In addition, a plurality of the catch unit 36 and of the catch perforation unit 37 is installed with respect to the vehicle length direction Y. In the present circumstance, it would be permissible for the catch unit 36 to be what might be termed a resin catch, which is formed solely from a resin, as a single part thereof, or what might be termed a metal catch, which is formed by attaching a metal clip material to the surface of the resin thereof. The imposition unit capable of separation and dropping away in time of emergency 31, which is formed by the catch unit 36 and the catch perforation unit 37, also comprises a function as a drop away load setting device for setting a load whereupon the potential drop away part 15 is separated and dropped with regard to the fixed installation part 16. It is possible to set the load thereof according to such as a size, a quantity, or a positioning of the catch unit 36 and the catch perforation unit 37 thereupon.

Following is a description of an effect according to the embodiment.

The box body 3 appears by opening the lid body 5, centering upon the hinge unit 7, and it is thereby possible to insert an item into, and remove an item from, the box body 3.

Conversely, the box body 3 is concealed by closing the lid body 5, centering upon the hinge unit 7, and it is thereby possible to store an item within the box body 3.

Thus, when a passenger comes into contact with the console box 2, such as in an emergency, it is conceivable that the box body 3 may cause a significant recoil by coming into contact with the proximity part 9.

Figure 5:
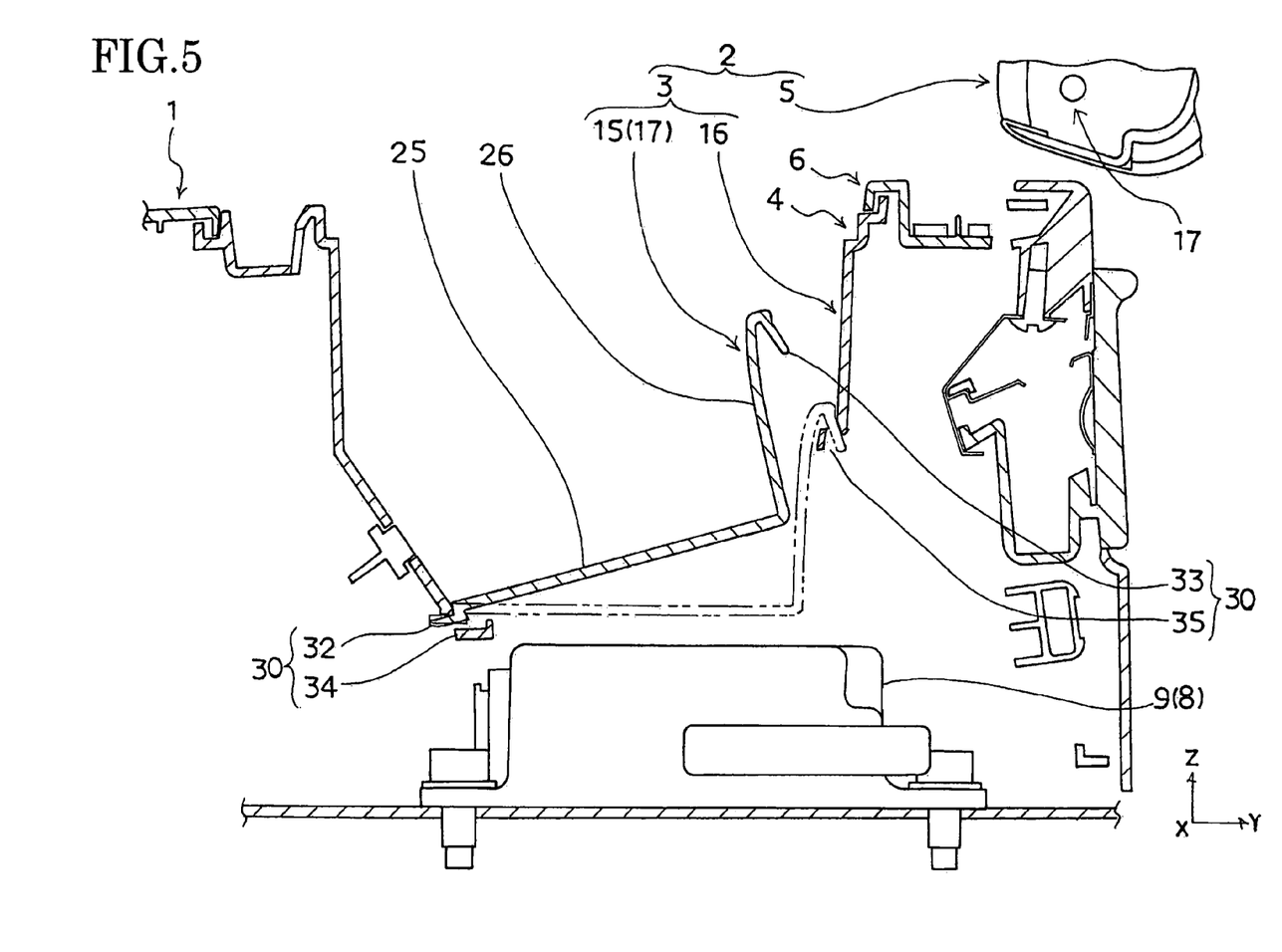
FIG. 5 is an operation diagram of the vertical cutaway view that is depicted in FIG. 4.

According to the embodiment, however, the box body 3 of the console box 2 is divided into the potential drop away part 15, which is located in the proximity to the proximity part 9, and the fixed installation part 16, which is the unit of the box body 3 that is other than the potential drop away part 15, and, under a normal usage circumstance thereof, the fixed installation part 16 and the potential drop away part 15 is capable of being combined, and used, in a unified manner, whereas, in an emergency, the potential drop away part 15, which is in contact with the proximity part 9, is capable of separating from, and dropping away with respect to, the fixed installation part 16, thereby being capable of reducing to a minimum the occurrence of the recoil with respect thereto.

In particular, in a circumstance such as when, in an emergency, a head portion, or other body part, of the passenger comes into contact with the lid body 5 from above, with the lid body 5 in the closed state thereof, it is possible to reduce to a minimum the occurrence of the recoil with respect thereto by the base plate configuration member 17, which is in contact with the air bag sensor 8, separating from, and dropping away with respect to, the fixed installation part 16. It is thereby possible to install the air bag sensor 8 beneath the box body 3 in a stable fashion.

More concretely, the base plate configuration member 17 separates, and drops away, from the fixed installation part 16, rotating upward thereupon, centering thereof upon the fore protrusion tab 32 and the fore protrusion unit 34, which remain without being detached thereupon, by a detachment of the aft protrusion tab 33 from the aft protrusion unit 35, and the detachment of the left and right catch unit 36 from the left and right catch perforation 37.

In such a circumstance, it is possible to set, by way of the left and right catch unit 36 from the left and right catch perforation 37, as a drop away load setting unit, a load for the circumstance whereupon the potential drop away part 15 separates and drops away with respect to the fixed installation part 16, thereby allowing a configuration wherein the base plate configuration member 17 does not unexpectedly separate and drop away from the fixed installation part 16 as a result of such as a sudden load occurring thereupon in the normal usage circumstance thereof, and does operate reliably thereupon in the emergency circumstance thereof.

According to the present invention, a box body of a console box is divided into a potential drop away part, which is located in a proximity to a proximity part, and a fixed installation part, which is other than the potential drop away part, and it is possible thereby that, under a normal usage circumstance thereof, the fixed installation part and the potential drop away part is combined in a unified manner, whereas, in an emergency, the potential drop away part, which is in contact with the proximity part, is capable of separating from, and dropping away with respect to, the fixed installation part thereby facilitating a reduction to a minimum of an occurrence of a recoil with respect therewith.

In addition, it is possible, in an emergency, to reduce to a minimum the occurrence of the recoil with respect thereto by the base plate configuration member, which is in contact with the air bag sensor, separating from, and dropping away with respect to, the fixed installation part. It is thereby possible to install the air bag sensor beneath the box body in a stable fashion.

While the embodiment according to the invention has been described in detail herein with reference to the attached drawings, it is to be understood that the embodiment described herein is only an exemplary embodiment according to the present invention, that the present invention is not restricted to the configuration of the embodiment, and that even such as a change of a design of a scope of the claims that does not exceed the concept of the invention is included within the present invention. In addition, it is to be understood that when, as an instance thereof, a plurality of configurations is included within each respective embodiment thereof, a possible combination of the configuration thereof is also included within the present invention even if not especially disclosed herein. In addition, it is to be understood that, when a plurality of embodiments or variant embodiments are disclosed, a possible combination of the configurations thereof, from among the combinations of the configurations thereof that span the plurality of embodiments or variant embodiments thus disclosed, is also included within the present invention even if not especially disclosed herein. In addition, it is to be understood that a configuration that is rendered within the attached drawings is also included within the present invention even if not especially disclosed herein.

What is claimed is:

1. A console box structure, comprising:
   a console box including a box body; and
   a potential drop away part which is located in a proximity to a proximity part and a fixed installation part which is other than the potential drop away part, the potential drop away part and the fixed installation part being formed by dividing the box body,
   wherein the fixed installation part and the potential drop away part are combined in a unified manner under a normal usage circumstance, whereas, the potential drop away part, which is in contact with the proximity part, is capable of separating from, and dropping away with respect to, the fixed installation part in an emergency.

2. The console box structure according to claim 1, wherein:
   the proximity part is an in-vehicle instrument configured to be located beneath the box body; and
   the potential drop away part is a base plate configuration member of the box body.

3. The console box structure according to claim 1, wherein:
   the box body is formed into a separated body configured to be made of a resin, and to comprise the fixed installation part and the potential drop away part.

4. The console box structure according to claim 3, wherein:
   the proximity part is an in-vehicle instrument configured to be located beneath the box body; and
   the potential drop away part is a base plate configuration member of the box body.

5. The console box structure according to claim 4, wherein:
   in an emergency, the base plate configuration member, which is in contact with the in-vehicle instrument, is separated from, and dropped away with respect to, the fixed installation part.

6. The console box structure according to claim 2, wherein the in-vehicle instrument includes an air bag sensor or electronic device.

7. The console box structure according to claim 4, wherein the in-vehicle instrument includes an air bag sensor or electronic device.

* * * * *